United States Patent
Isokawa (10) Patent No.: US 6,381,725 B1
(45) Date of Patent: Apr. 30, 2002

(54) DISK DEVICE AND DATA ERROR CORRECTION METHOD THEREOF

(75) Inventor: Hiroshi Isokawa, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,880

(22) Filed: Mar. 19, 1999

(30) Foreign Application Priority Data

Aug. 18, 1998 (JP) .......................... 10-232065

(51) Int. Cl.[7] ................................. G11C 29/00
(52) U.S. Cl. ....................................... 714/769
(58) Field of Search ................. 714/769, 761; 360/25, 53

(56) References Cited

U.S. PATENT DOCUMENTS

| | | | |
|---|---|---|---|
| 5,844,919 A | * 12/1998 | Glover et al. | 714/769 |
| 6,043,946 A | * 3/2000 | Genheimer et al | 360/53 |
| 6,061,824 A | * 5/2000 | Mo et al. | 714/769 |
| 6,125,469 A | * 8/2000 | Zook et al. | 714/769 |
| 6,178,053 B1 | * 1/2001 | Narita | 360/25 |

FOREIGN PATENT DOCUMENTS

JP        564855        1/1981

* cited by examiner

*Primary Examiner*—Albert Decady
*Assistant Examiner*—Shelly A Chase
(74) *Attorney, Agent, or Firm*—Greer, Burns & Crain, Ltd (57) ABSTRACT

The storage unit of the present invention registers a plurality of data read conditions set in a plurality of parameters, an MPU reads data read conditions from the storage unit to an IC for read/write (R/W) in order and the MPU reads data from a magnetic disk according to these data read conditions. Then, a retry is repeated until normal data are obtained, the normal data are read, the frequency of data read conditions in the case where an error is recovered from, is accumulated, and the data read conditions are replaced when the accumulated value exceeds a certain threshold. By setting data read conditions whose probability of error recovery is high, in a higher order, the frequency of the retrying is reduced, and thereby a data error correction device and the correction method thereof can be provided such that data can be read from a magnetic disk in a short time.

12 Claims, 12 Drawing Sheets

| RETRY TABLE 11 | | | | | | | | | | Step | ERROR RECOVERY FREQUENCY STORAGE SECTION 12 |
|---|---|---|---|---|---|---|---|---|---|---|---|
| Prm.1 | Prm.2 | ... | Prm.n | | | | | | | Step 1 | C(1) |
| Prm.1 | Prm.2 | ... | Prm.n | | | | | | | Step 2 | C(2) |
| Prm.1 | Prm.2 | ... | Prm.n | | | | | | | Step 3 | C(3) |
| | | | | | | | | | | ... | ... |
| Prm.1 | Prm.2 | ... | Prm.n | | | | | | | Step (n-1) | C(n-1) |
| Prm.1 | Prm.2 | ... | Prm.n | | | | | | | Step n | C(n) |
| | | | | | | | | | | ... | ... |
| Prm.1 | Prm.2 | ... | Prm.n | | | | | | | Step M | C(M) |

AN EXAMPLE OF THE ACCUMULATION OF ERROR RECOVERY FREQUENCIES

ACCUMULATION TABLE OF ERROR RECOVERY FREQUENCIES

| FREQUENCY OF RETRYING | FIRST TIME | SECOND TIME | THIRD TIME | ... | N TIMES |
|---|---|---|---|---|---|
| Step 1 | 0 | 0 | 0 | 0 | 0 |
| Step 2 | 0 | 0 | 0 | 0 | 0 |
| Step 3 | 0 | 0 | +1 | 1 | 2 |
| ... | 0 | 0 | 0 | 0 | 0 |
| Step (n-1) | 0 | 0 | +1 | 1 | 2 |
| Step n | +1 | 1 | 1 | 1 | 0 → 4 → 10 |
| ... | 0 | 0 | 0 | 2 | 0 |
| ... | 0 | 0 | 0 | +1 | 3 |
| Step M | 0 | 0 | 0 | 0 | 0 |

| RETRY TABLE | Prm. 1 | Prm. 2 | ... | Prm. n |
|---|---|---|---|---|
| Step 1 | Prm. 1 | Prm. 2 | ... | Prm. n |
| Step 2 | Prm. 1 | Prm. 2 | ... | Prm. n |
| Step 3 | Prm. 1 | Prm. 2 | ... | Prm. n |
| Step(n−4) | Prm. 1 | Prm. 2 | ... | Prm. n |
| Step(n−3) | Prm. 1 | Prm. 2 | ... | Prm. n |
| Step(n−2) | Prm. 1 | Prm. 2 | ... | Prm. n |
| Step(n−1) | Prm. 1 | Prm. 2 | ... | Prm. n |
| Step n | Prm. 1 | Prm. 2 | ... | Prm. n |
| Step(n+1) | Prm. 1 | Prm. 2 | ... | Prm. n |
| Step M | Prm. 1 | Prm. 2 | ... | Prm. n |

Group 1: Steps 1–3
Group N−1: Steps (n−4)–(n−2)
Group N: Steps (n−1)–(n+1)

| FREQUENCY OF ERROR RECOVERY | | | | |
|---|---|---|---|---|
| G(1) | ... | G(N−1) | G(n) | ... |

14 (Retry Table), 15 (Frequency of Error Recovery)

| | AFTER CHANGE OF A PARAMETER | |
|---|---|---|
| Step 1 | Prm. 1 | Prm. 2 | ... |
| Step 2 | Prm. 1 | Prm. 2 | ... |
| Step 3 | Prm. 1 | Prm. 2 | ... |
| Step 4 | Prm. 1 | Prm. 2 | ... |
| Step (n−1) | Prm. 1(+1) | Prm. 2 | ... |
| Step n | Prm. 1(−1) | Prm. 2 | ... |
| Step (n+1) | Prm. 1(−2) | Prm. 2 | ... |
| Step (M+1) | Prm. 1 | Prm. 2 | ... |

(b)

| | BEFORE CHANGE OF A PARAMETER | |
|---|---|---|
| Step 1 | Prm. 1 | Prm. 2 | ... |
| Step 2 | Prm. 1 | Prm. 2 | ... |
| Step 3 | Prm. 1 | Prm. 2 | ... |
| Step 4 | Prm. 1 | Prm. 2 | ... |
| Step (n−1) | Prm. 1(+1) | Prm. 2 | ... |
| Step n | Prm. 1(−1) | Prm. 2 | ... |
| Step M | Prm. 1 | Prm. 2 | ... |

DISK DEVICE AND DATA ERROR CORRECTION METHOD THEREOF

BACKGROUND OF THE INVENTION

1. Field of the Invention

The present invention relates to a magnetic disk device for storing and reproducing data, and more particularly a data error correction device used when a data error occurs, and the correction method thereof.

2. Description of the Prior Art

Today, magnetic disk devices are used as hard disks or fixed disks for personal computers, etc. The magnetic disk devices have concentric circular tracks for storing data, and one track is composed of a plurality of sectors. A magnetic head shifts in a direction perpendicular to the concentric circular tracks from the outermost track to the innermost track, and writes data in and reads data from the magnetic disk.

Today, miniaturized, large-capacity and high-density magnetic disk devices are required. For this reason, the improvement in both the number of recorded bits per inch (track recording density (BPI) (bits per inch) and the number of recorded tracks per inch (track density (TPI) (tracks per inch)) is indispensable. However, high track recording density causes interference between individual data bits, while high track density causes interference between tracks, both of which degrade the quality of read signals and lead to an increase in data errors. Under these circumstances, if a read error occurs, conventionally parameters are changed according to a rewrite step stored in a storage unit, and the data are repeatedly read until normal data are obtained. For example, by making the cut-off frequency of a filter variable or changing the dimension of a sense current from a pre-amplifier to the magnetic head as such changed parameters, retrying is repeated.

For example, when the dimension of a sense current is variable as a parameter, sense currents changed at intervals of 0.1 mA, that is, 9.1 mA, 9.2 mA, 9.3 mA, . . . , etc. are made to flow in the coil of the magnetic head, and this variable process is repeated until normal data are obtained.

According to the retry method, by repeating a great number of data readings, normal data can be obtained. However, it often takes a lot of time to obtain normal data. For example, when normal data are obtained in a series of steps, the execution of the previous steps takes a lot of time. That is, when the parameter set in the last step is the optimum value of the device, the retry must be repeated until the last step is reached, every time. Such a data reading takes a long time.

SUMMARY OF THE INVENTION

An object of the present invention is to provide both a data error correction device and a method thereof for reducing the time needed to obtain normal data by using a retry method and by reducing the frequency of retries.

That is, the object of the present invention is accomplished by providing a disk device comprising a storage unit for storing a plurality of data read conditions set in a plurality of parameters, a data read unit for reading data from a disk according to a first data read condition stored in the storage unit, a data re-read unit for, when an error occurs in data read by the data read unit, changing the first data read condition to a second data read condition and reading data from the disk again, and a replacement unit for, when the error is recovered from and normal data are obtained by reading the data again, replacing the orders of the first and second data read conditions stored in the storage unit.

Each of the first and second read conditions has a plurality of parameters, and the parameters are a variety of read conditions used when data are read from the magnetic disk, and, for example, are individual characteristics of the magnetic disk device. Therefore, by changing the set value of these parameters, data read conditions are changed, and even if normal data cannot be obtained by a first read condition, normal data can be often read by changing the first read condition to a second read condition.

This preferred embodiment has a configuration such that the values of parameters are made variable and when normal data are obtained by changing the data read condition from the first condition to the second condition, the first data read condition is replaced by the second data read condition by the replacement unit.

According to such a configuration, when data are subsequently read from a disk, a time needed to obtain normal data is reduced, and rapid data reading becomes possible.

For example, the data read conditions are stored in the storage unit in units of the same parameter groups, and the replacement unit replaces the data read conditions in units of the groups.

According to such a configuration, when the change of only a certain parameter is effective in recovering from an error, data read conditions can be efficiently replaced, and thereby the retry process of this preferred embodiment can be rapidly executed.

In the group replacement, for example, the counter unit counts error recovery frequency. When the value reaches a predetermined threshold, the replacement of data read conditions is performed for each parameter group.

DESCRIPTION OF THE PREFERRED EMBODIMENTS

The detailed preferred embodiments of the present invention are described with reference to drawings.

First Embodiment

Figure 1:
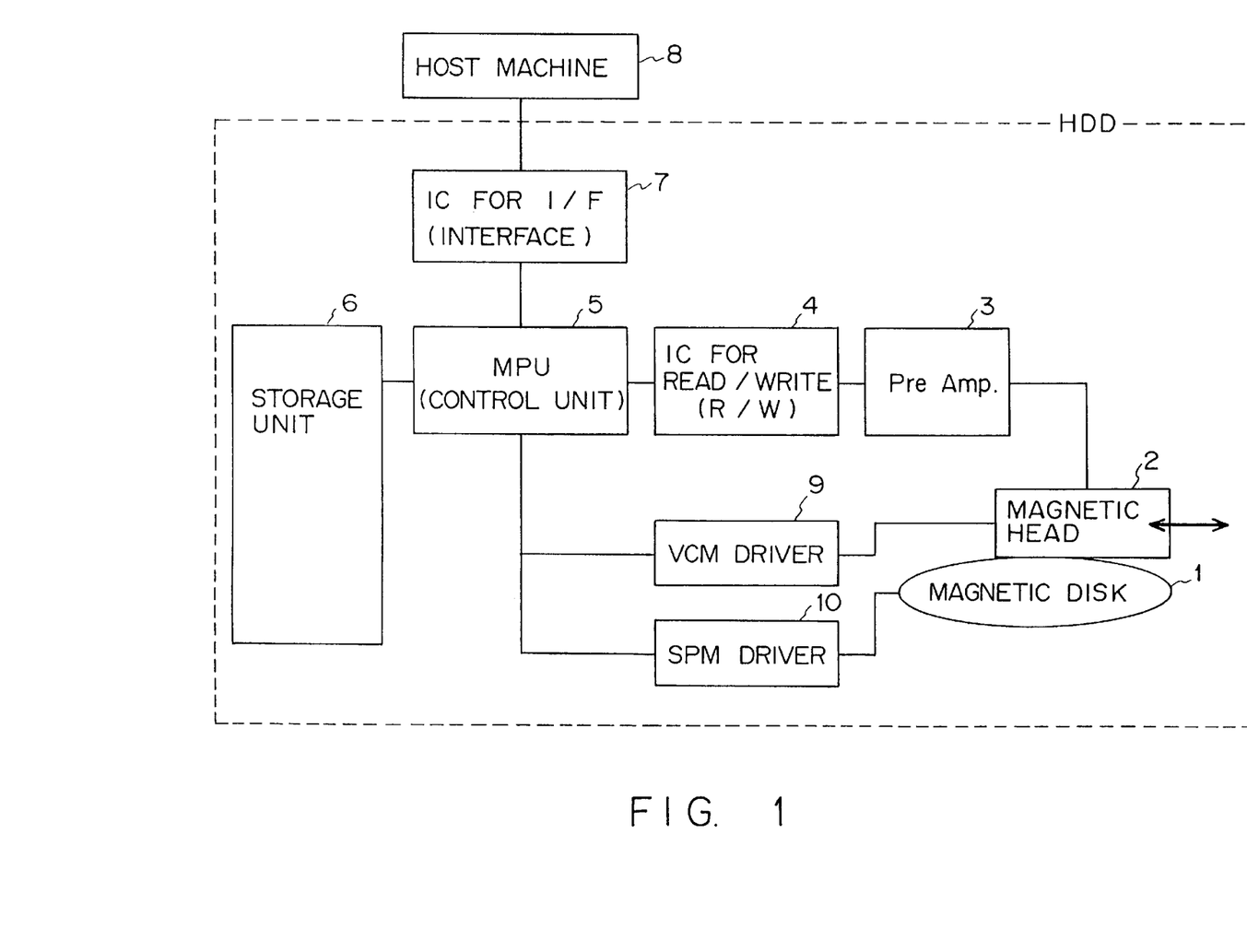
FIG. 1 shows the system configuration of the data error correction method of this preferred embodiment.

FIG. 1 shows the system configuration of the data error correction device and the method thereof of this preferred embodiment. In FIG. 1, 1 indicates a magnetic disk, on which tracks are formed in concentric circles and each track is composed of a plurality of sectors. A magnetic head 2 can be moved in a direction shown by an arrow and shifts from the outermost track to the innermost track formed on the magnetic disk 1, by which data is written in and read from the magnetic disk.

The magnetic disk 1 is rotated in a certain direction by a spindle motor, not shown in FIG. 1, and simultaneously the magnetic head 2 is shifted in an arrow direction to a designated access position over the magnetic disk 1, and data writing and reading are executed.

Figure 2:
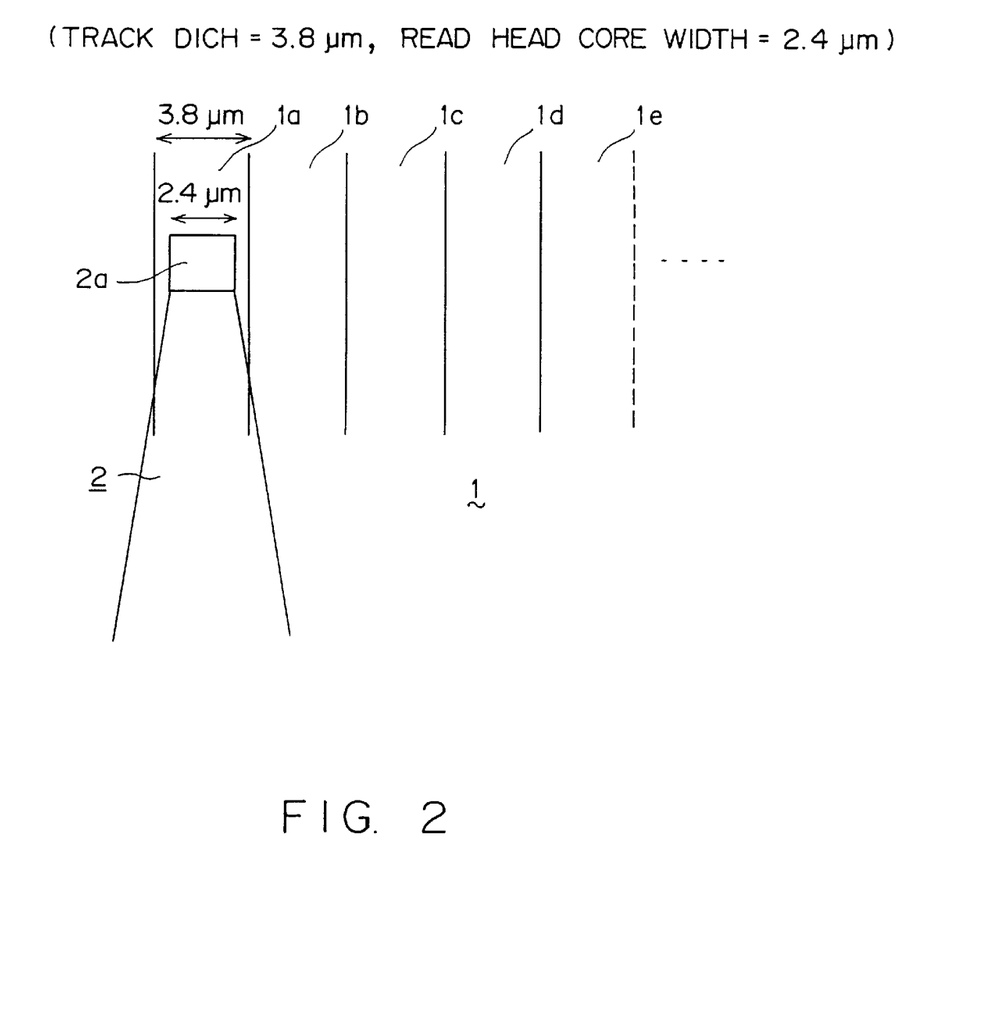
FIG. 2 shows a relationship between the core position of a magnetic head and the track position of a magnetic disk.

FIG. 2 shows a magnetic head 2 positioned over a magnetic disk 1, and the core 2a of the magnetic head 2 is positioned over a track 1a, 1b or 1c, . . . formed on the magnetic disk 1. In this preferred embodiment, for example, the track pitch of each of the tracks, 1a, 1b, 1c, . . . , is set to 3.8 μm, and the core width of the magnetic head 2, to 2.4 μm. The core of the magnetic head 2 writes data in each track and reads data from each track.

Further, as shown in FIG. 1, a pre-amplifier 3 is connected to the magnetic head 2, for example, data read by the magnetic head 2 are outputted to the pre-amplifier 3, and the data signals are amplified. The amplified signals are outputted from the pre-amplifier to an IC 4 for read/write (R/W). Each of parameters described later is set in the read/write (R/W) IC 4, and a retry is executed according to these set values.

An MPU (main processing unit) 5 is a CPU (central processing unit) for controlling the system of the magnetic disk 1 of this preferred embodiment, and executes processes according to a program stored in a storage unit 6. For example, the data supplied through the pre-amplifier 3 are converted to a data line consisting of "0s" and "1s" by the control of the MPU 5, and are stored in the storage unit 6.

In the storage unit 6, data read conditions described later are registered, and read to the read/write (R/W) IC 4 under the control of the MPU 5.

The MPU 5 is connected to a host machine 8 through an interface (I/F) IC 7, analyzes commands (instructions) supplied from the host machine 8, and executes the instructions designated by the commands.

Further, a VCM (voltage controlled motor) driver 9 is a motor driver for driving the magnetic head 2, and drives the magnetic head 2 in an arrow direction according to a control signal received from the VCM driver 9. An SPM (spindle motor) driver 10 is a driver unit for driving a spindle motor, not shown in FIG. 2, and the SPM driver 10 drives the magnetic disc 1 under the control of the MPU 5.

Figure 3:
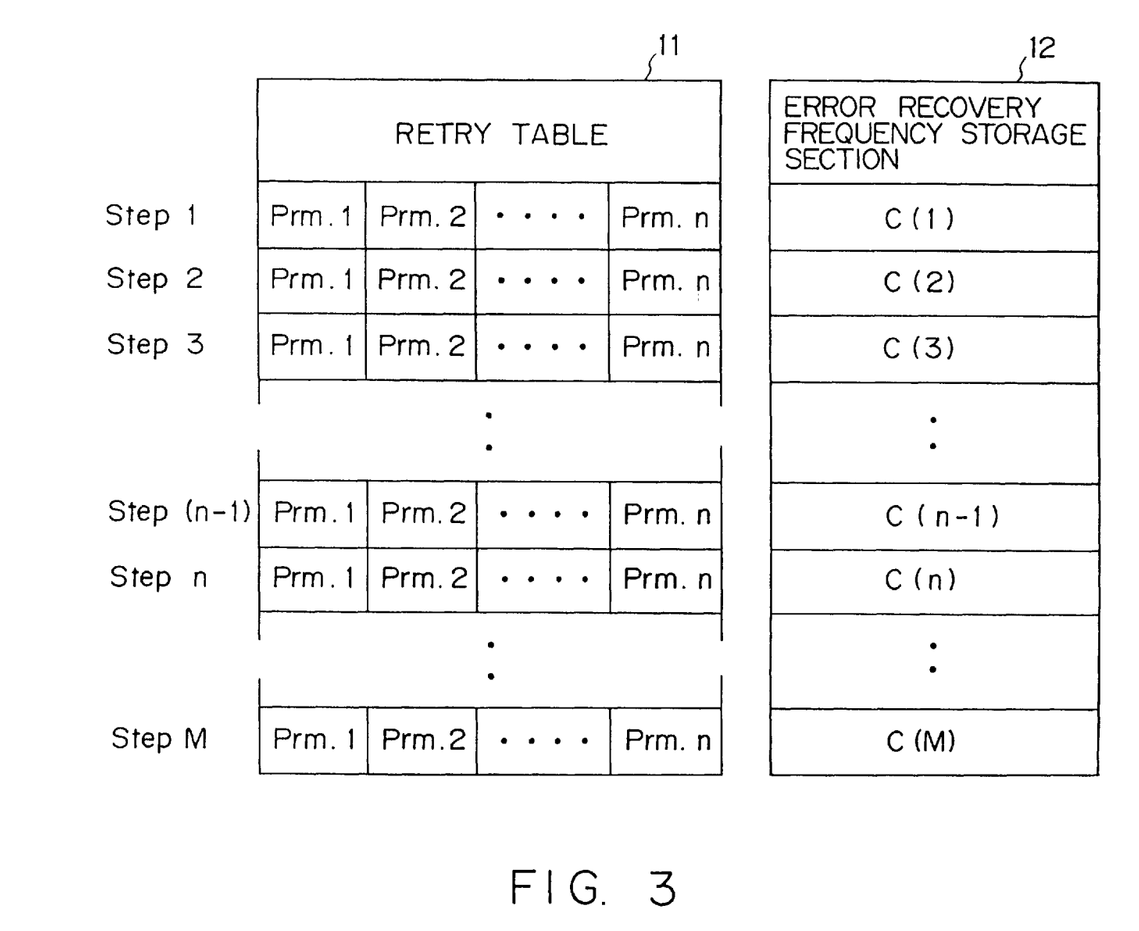
FIG. 3 shows the memory configuration of the storage unit in a first preferred embodiment.

FIG. 3 shows the memory configuration of the storage unit 6. As shown in FIG. 3, the storage unit 6 comprises a retry table 11 and an error recovery frequency storage table 12. The retry table 11 registers data read conditions, and a different data read condition is registered in 1 to M of M steps. In each of the steps, a data read condition composed of n parameters is set.

For example, in each step, a sense current value for the magnetic head 2 is set in Prm.1, and a series of current values which are updated in intervals of 0.1 mA, are set. For example, in Prm. 1 of Step 1, a sense current value of 9.0 mA (default value) is set, in Prm.1 of Step 2, a sense current value is 9.1 mA (default value+0.1 mA), in Prm.1 of Step 3, a sense current value is 9.2 mA (9.1 mA+0.1 mA), and in Prm.1 of the next and subsequent Steps, a sense current value is set by adding an immediately preceding value to 0.1 mA.

For example, in Prm.2 of each Step, the cut-off frequency of a filter is set, for example, a series of frequencies which are updated at intervals of 3 MHz. For example, in Prm.2 of Step 1, a cut-off frequency is 100 MHz (default value), in Prm.2 of Step 2, a cut-off frequency is 103 MHz (100 MHz+3 MHz), in Prm.2 of Step 3, a cut-off frequency is 106 MHz (103 MHz+3 MHz), and in Prm.2 of the next and subsequent Steps, a cut-off frequency is set by adding an immediately preceding value to 3 MHz.

In Prm.3, the ratio of a threshold level is set, for example, a series of voltage levels which are updated at intervals of 6%. For example, in Prm.3 of Step 1, a voltage level of 230 mV (50%) (default value) is set, in Prm.3 of Step 2, a voltage level is 237 mV (230 mV+1.6% of 230 mV) (51.6%), in Prm.3 of Step 3, a voltage level is 244 mV (237 mV+1.6% of 237 mV) (53.2%), and in Prm.3 of the next and subsequent Steps, a voltage level is set by adding an immediately preceding value to 1.6%.

Furthermore, in Prm.4 to Prm.n, a variety of values are set, for example, the amount of a track off-set, etc. is set for a parameter. The amount of a track off-set indicates the adjustment amount of the magnetic head 2 against the center position of a track on the magnetic disk 1.

The process operation in the configuration described above is described below.

First, the host machine 8 issues a read command to a magnetic disk device (HDD). In this case, a read signal is transmitted from the host machine 8 to the MPU 5 through an IC 7 for I/F, and the MPU .5 reads data from the magnetic disk 1 according to a program. The MPU 5 drives the magnetic head 2 in an arrow direction and shifts the magnetic head 2 to a position over the magnetic disk 1 by controlling the VCM driver 9 to read designated data from the magnetic disk 1. The magnetic disk 1 is rotated by the control of the SPM driver 10 when the host machine 8 is driven.

Figure 4:
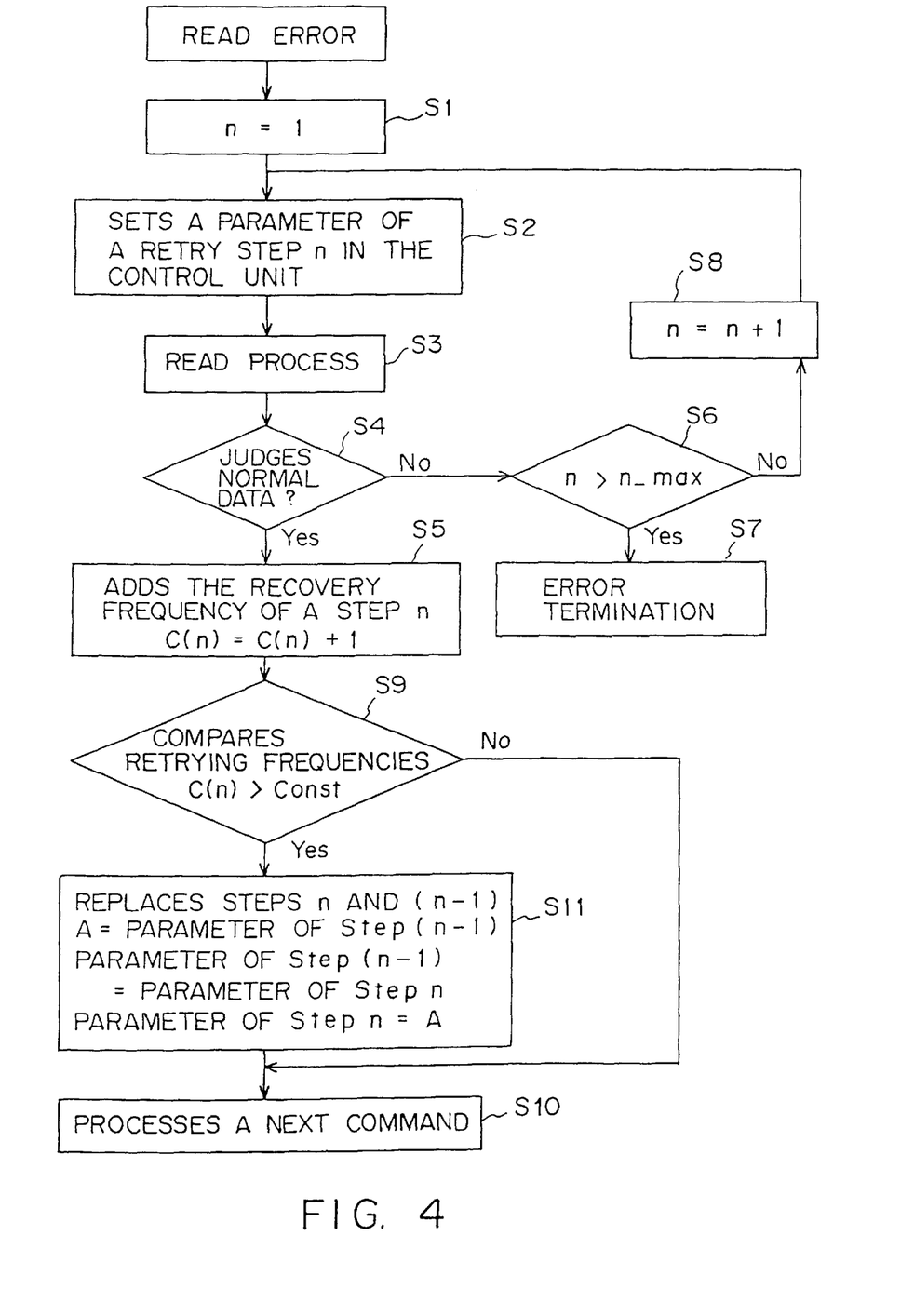
FIG. 4 is a flowchart showing the retry process in a first preferred embodiment.

FIG. 4 is a flowchart showing processes executed by the MPU 5. First, the MPU 5 sets Step n for the number of retries to "1" (step (hereinafter called S) 1). That is, the MPU 5 sets the Step number in a retry table in the storage unit 6 shown in FIG. 3 to "1", reads a parameter stored in Step 1 of the retry table, and sets the parameter in the IC 4 for read/write (R/W) (S2).

For example, in the example described above, for the parameters of Step 1, a sense current value to a magnetic head, which is 9.0 mA in Prm.1, a cut-off frequency, which is 100 MHz in Prm.2, and a threshold level, whose voltage level is 230 mV (50%) in Prm.3, are stored. Therefore, each of the parameter values is set in the IC 4 for read/write (R/W). Of course, other parameters (Prm.n) not shown in the example are simultaneously set.

Then, based on these parameters, a read process is executed (S3). That is, the magnetic head 2 is moved, and target data are read from the magnetic disk 1. At this time, based on each of the parameters, data are read. For example, based on the sense current value of Prm.1, the IC 4 for read/write (R/W) transmits corresponding digital data to the pre-amplifier 3, and the pre-amplifier 3 supplies the coil of the magnetic head 2 with a current of 9.0 mA. Based on this supplied current, data on the magnetic disk 1 are read.

Therefore, the level of data read from the magnetic disk 1 varies depending on the current values supplied to the coil, the data is amplified by the pre-amplifier 3, and the data is inputted to the IC 4 for read/write (R/W). This inputted data are filtered using the cut-off frequency of 100 MHz set in Prm.2, and a prescribed S/N ratio is secured. Furthermore, based on the threshold level (230 mV (50%)) set in Prm.3, the "1s" and "0s" of the inputted data are judged as to whether or not the read data are normal (S4).

If the read data is judged to be normal (Yes in S4), the recovery frequency of Step n is increased by one (S5). This is a case where the default values registered in a retry table 11 are properly set. In this case, "1" is added to the value of the section C (1) of the error recovery frequency storage section 12.

However, normal data are not always immediately obtained, and if an error occurs and normal data are not obtained, a retry is executed (No in S4, steps S6 and after). That is, whether or not the Step n of a parameter reaches a maximum value (a predetermined MAX value) is first judged (S6), and if it reaches the MAX value (Yes in S6), there is an error and the process is terminated (S7).

However, in the first approach, it does not reach the MAX value (No in S6), Step n is incremented by one (S8), and a retry is executed. That is, the Step of the retry table 11 is set to "2", parameters are read from the Step 2 of the retry table 11 to the IC 4 for read/write (R/W) (S2) again, and based on the new parameters, a retry is executed again.

A new data read condition is the conditions in the Step 2 of the retry table 11. For example, in the example described above, the sense current value in Prm.1 is 9.1 mA, the cut-off frequency Prm.2 is 103 MHz, and the threshold level Prm.3 is 237 mV (51.6%). Other parameters (Prm.n) not shown in the example are simultaneously set as described above.

Then, based on each of the parameters, a read process is again executed as described above (S3). At this time, based on the sense current value in Prm.1, the coil of the magnetic head 2 is supplied with a current of 9.1 mA, and data on the magnetic disk 1 are read. After the data are amplified by the pre-amplifier 3, the data are filtered using the cut-off frequency of 103 MHz set in Prm.2, and further the "1s" and "0s" of the inputted data are judged using the slice level (237 mV (51.6%)) set in Prm.3. Then, after the process described above, whether or not the data are normal is judged (S4), and if they are normal, the recovery frequency of Step n is increased by one (S5). In this case, "1" is added to the area of C (2) of the error recovery frequency storage section 12.

If an error occurs and normal data cannot be obtained, a retry is performed again (No in S4, steps S6 and after). This retry process is the same as that described above. The number of Step n is incremented by one (S8), data read conditions whose step in the retry table is "3", are read, and a retry process is repeated.

Thus, by repeating the retry, sooner or later normal data are obtained based on the proper data read conditions of the parameters, and the read error is recovered from. The number of the area C (n) in the error recovery frequency storage section 12 corresponding to the recovery frequency of the data read condition (step) where the error is recovered from, is incremented by 1 (S5).

Figure 5:
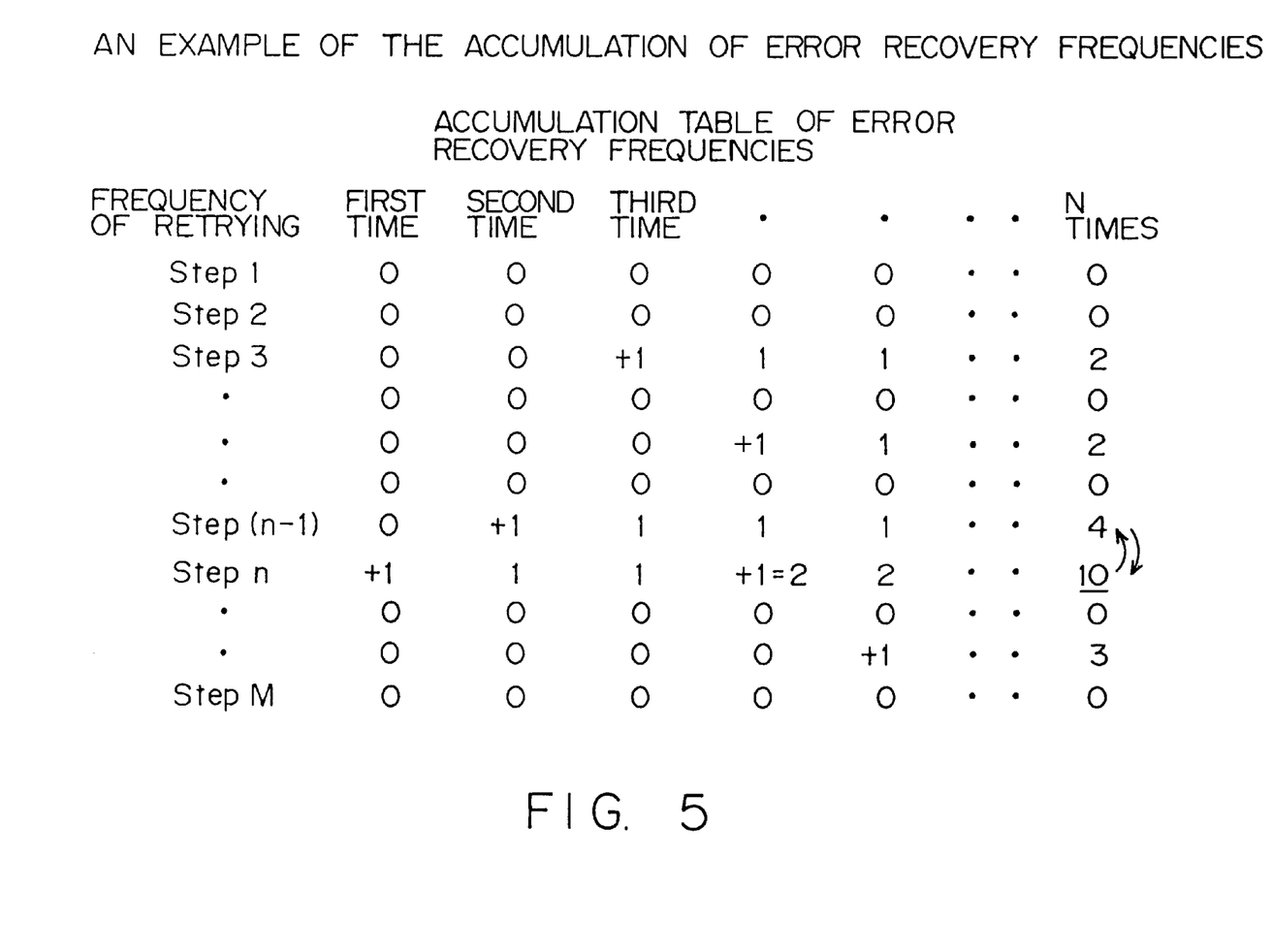
FIG. 5 shows an accumulation of error recovery frequencies.

FIG. 5 shows the accumulation table of error recovery frequency in the case where a retry process is repeated as described above, for example, the retry is repeated n times. In this table, the total error recovery frequency in Step n is 10.

The MPU 5 compares the error recovery frequency with a threshold (Const) every time a retry is completed (S9 in FIG. 4), and until the error recovery frequency exceeds the threshold (No in S9), the process is repeated (S10). If it exceeds the threshold (Yes in S9), the replacement of steps is performed (S11). For example, assuming that the threshold is "10", the total error recovery frequency of a step reaches the threshold by n times of retries, and the replacement of parameters is performed.

In this replacement of parameters, for example, the parameters of Step (n−1) are written in a register "A", and in the area where the parameters of Step n are written, the parameters of Step n are overwritten as they are. Then, the parameters of Step (n−1) saved in the register "A" are written in the area where the immediately preceding step (Step n) was registered.

By executing the process described above, the parameters of Step n and Step (n−1)) are substituted, and in subsequent processes, a parameter of the immediately preceding step is first read, and the probability of normal data reading increases. That is, since when by repeating the process, the error recovery frequency exceeds a threshold value, the data read conditions roll forward, and as a result, a step with the parameter of a data read condition for obtaining normal data is positioned in a earlier read order, and normal data can be rapidly read from the magnetic disk 1.

Although in the preferred embodiment described above, the threshold value is determined to be "10", this value is not limited to "10", but can be an arbitrary numerical value.

Although in the above description of preferred embodiments, the size of a sense current, etc. is made variable in an ascending order, this can be made variable in a descending order or a direction of a change can be modified either way. In this case, for example, the sense current value changes from 9.0 mA to 9.1 mA, from 9.1 mA to 9.2 mA, from 9.2 mA to 8.9 mA, from 8.9 mA to 8.8 mA, . . . the cut-off frequency changes from 100 MHz to 103 MHz, from 103 MHz to 106 MHz, from 106 MHz to 109 MHz, from 109 MHz to 97 MHz, from 97 MHz to 94 MHz, from 94 MHz to 91 MHz, ..., etc.

Although in the above description of the preferred embodiments, the sense current, cut-off frequency and slice level are simultaneously changed, first, only the sense current can be made variable, next, only the cut-off frequency can be made variable, and next, only the slice level can be made variable.

Figure 6:
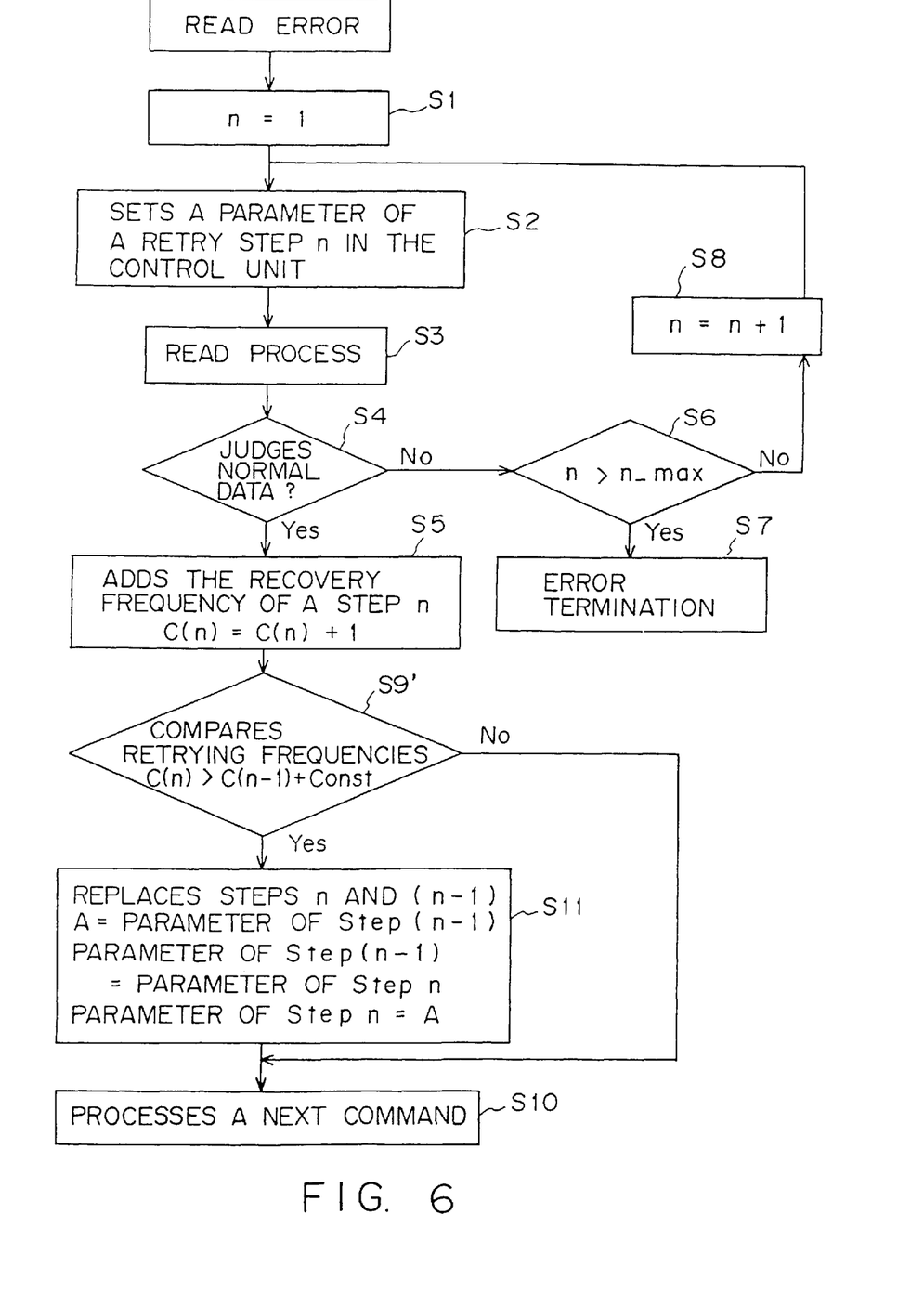
FIG. 6 is a flowchart showing another aspect of the first preferred embodiment.

Furthermore, in the above description of preferred embodiments, when normal data can be obtained by a retry process, "1" is added to the number of the corresponding area C (n) of the error recovery frequency storage section 12, which is compared with a predetermined value (Const) (S9, S11). However, as shown in FIG. 6, the comparison formula of the retrying frequencies can be made C (n)>C (n−1)+ Const (S9').

That is, each of the data read conditions of the retry table 11 is read from the storage unit 6 in order, a retry is executed (S1 through S8), the value of accumulated error recovery frequencies is written in the corresponding area C (n) of the error recovery frequency storage section 12 every time an error is recovered, the value is compared with the value of accumulated error recovery frequencies in an immediately preceding step (S9'), and if it exceeds the value of accumulated error recovery frequencies in an immediately preceding step and there is a prescribed difference between the accumulated values, the replacement of the data read conditions is performed.

In this configuration, too, as a result, a step with the parameters of data read conditions for obtaining normal data is positioned in an earlier read order, and normal data can be rapidly read from the magnetic disk 1.

Although in the above description, it is required that the accumulated value exceeds the value of accumulated error recovery frequencies in the immediately preceding data read condition and there is a prescribed difference between the accumulated values, the replacement of data read conditions can be configured to be performed without the prescribed difference between the accumulated values, only if the value of accumulated error recovery frequencies in the immediately preceding data read condition.

Second Preferred Embodiment

Next, the second preferred embodiment of the present invention is described below.

In this preferred embodiment, the same system configuration shown in FIG. 1 as used in the description of the first preferred embodiment is adopted. That is, comprising the magnetic disk 1 and magnetic head 2. For example, data read by magnetic head 2 are outputted to the pre-amplifier 3, the data signals are amplified by the pre-amplifier 3, and are outputted to the IC 4 for read/write (R/W). The MPU 5 is a CPU for controlling the system of this preferred embodiment, and controls the system according to a program stored in the storage unit 6. The MPU 5 is connected to the host machine 8 through the IC 7 for interface (I/F), analyzes commands (instructions) supplied from the host machine 8, and executes the instructions directed by the commands.

Figure 7:
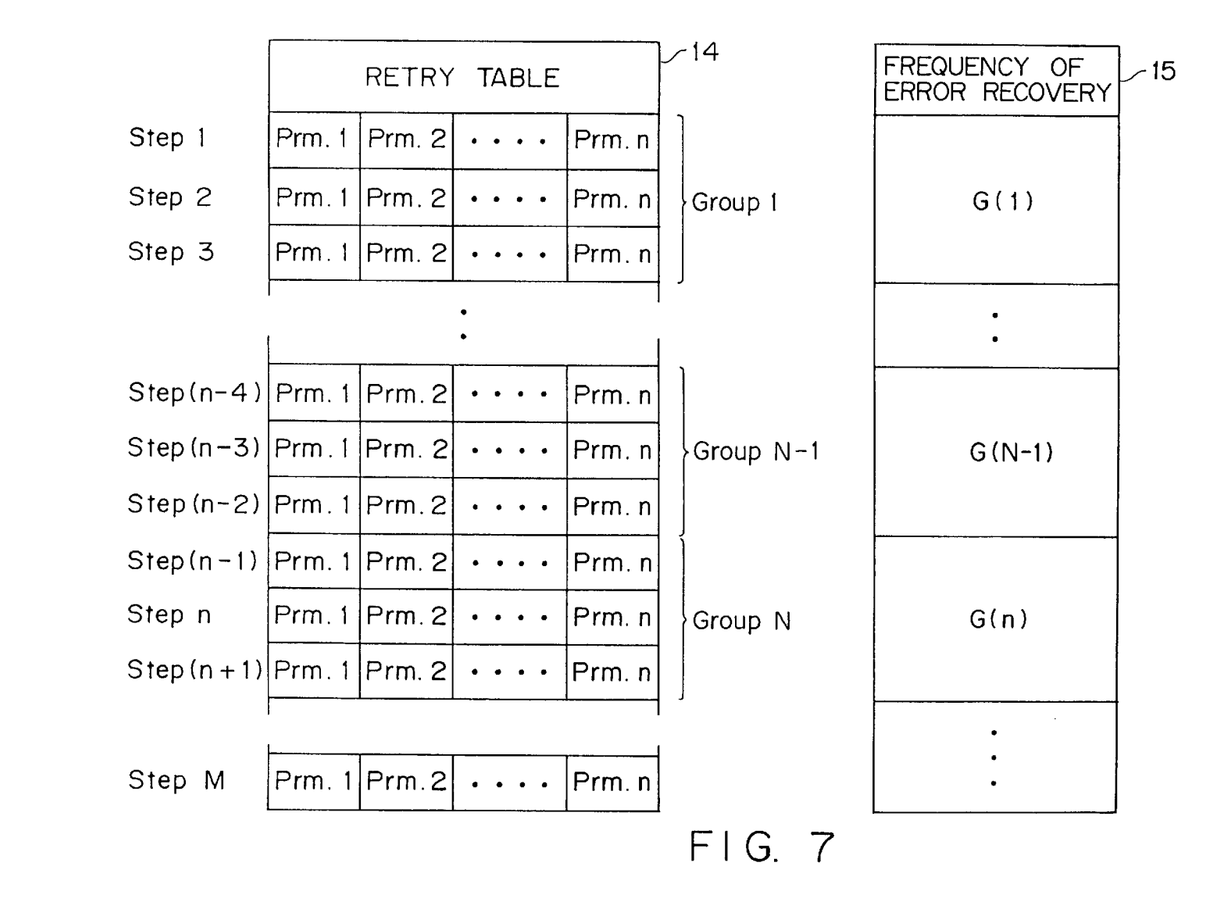
FIG. 7 shows the memory configuration of a storage unit in a second preferred embodiment.

The memory configuration of the storage unit 6 in the preferred embodiment is different from that of the first preferred embodiment. FIG. 7 shows the memory configuration of the storage unit 6 in this preferred embodiment. As shown in FIG. 7, the memory configuration of the preferred embodiment comprises a retry table 14 and an error recovery frequency storage section 15.

In this preferred embodiment, the retry table 14 is classified into a plurality of groups, and all changes of only one specific parameter are classified into one group. It is assumed here that there are n such groups.

For example, group 1 is a group of data read conditions where only data Prm.1 regarding a sense current are changed, to which Step 1 through Step 3 of the retry table 14 correspond. For example, in Prm.1 of Step 1, a sense current of 9.0 mA is set, in Prm.1 of Step 2, a sense current of 9.1 mA is set, and in Prm.1 of Step 3, a sense current of 9.2 mA is set. In Prm.2 through Prm.n of group 1, other parameters having the same values are registered.

On the other hand, for example, group N−1 is a group of data read conditions where only data Prm.2 regarding a cut-off frequency are changed, to which the Step (n−4) through Step (n−2) correspond. For example, in Prm.2 of Step (n−4), a cut-off frequency of 100 MHz is set, in Prm.2 of Step (n−3), a cut-off frequency of 103 MHz is set, and in Prm.2 of Step (n−2), a cut-off frequency of 106 MHz is set.

Furthermore, group N is a group of data read conditions where only data Prm.3 regarding a threshold level is changed, to which the Steps (n−1) through Step (n+1) correspond. For example, in Prm.3 of Step (n−1), a threshold level of 230 mV (50%) is set, in Prm.3 of Step n, 237 mV (51.6%) is set, and in Prm.3 of Step (n+1), a threshold level of 244 mV (53.2%) is set.

The process operation in the configuration described above is described below.

As in the first preferred embodiment, the host machine 8 outputs a read signal to the magnetic disk device, and the MPU 5 reads data from the magnetic disk 1 according to a program. Then, the MPU 5 drives the magnetic head 2 in an arrow direction by controlling the VCM driver 9, and moves the magnetic head 2 to a designated position on the magnetic disk 1 to read designated data from the magnetic disk 1.

Figure 8:
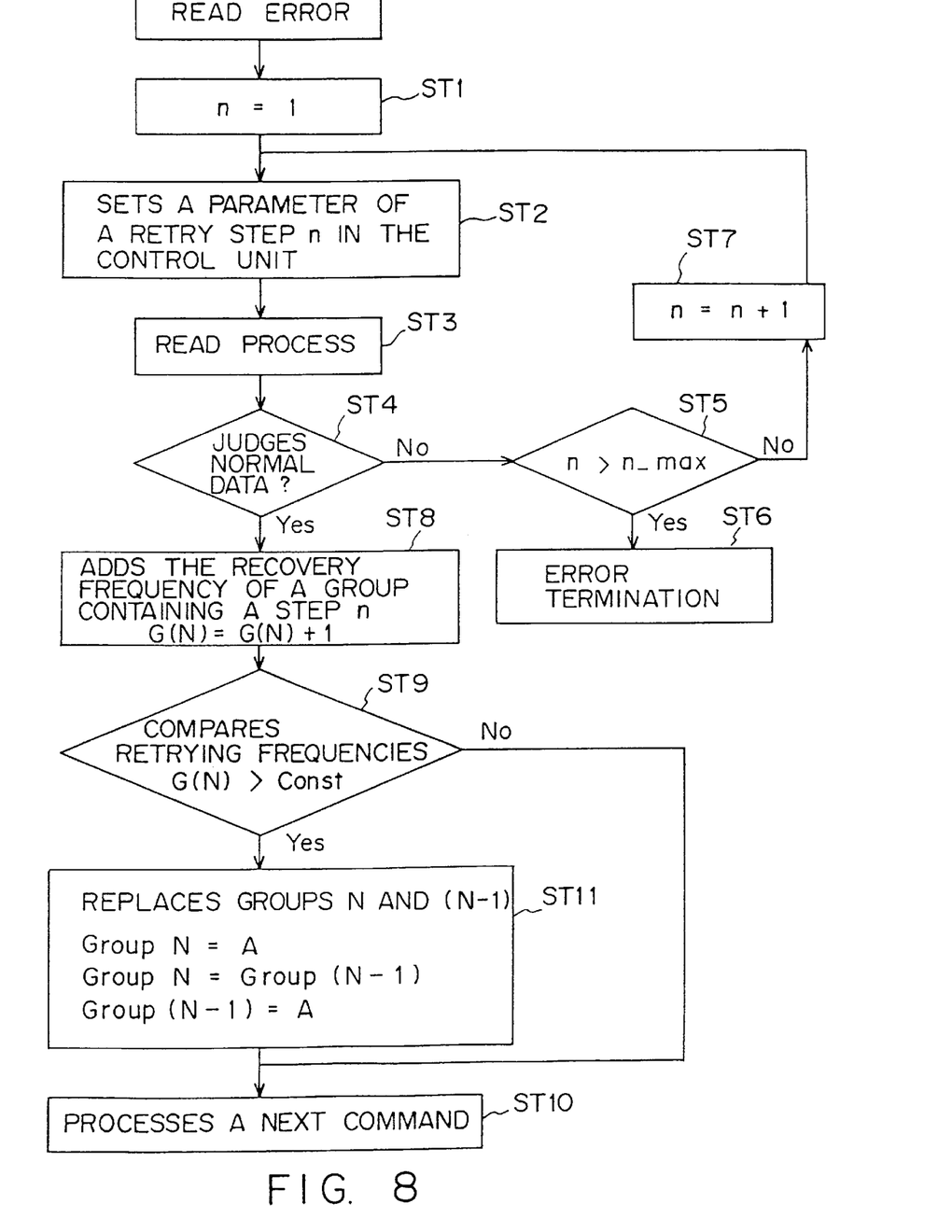
FIG. 8 is a flowchart showing the retry process of a second preferred embodiment.

FIG. 8 is a flowchart showing the process of this preferred embodiment. Also in this preferred embodiment, first, Step n is set to "1" (step (hereinafter called ST) 1). That is, a step of the retry table 14 in the storage unit 6 shown in FIG. 7 is set to "1", and parameters registered in Step 1 of the retry table 14 are read, and the parameters are set in the IC 4 for read/write (R/W) (ST2).

For example, in the first preferred embodiment, Prm.1 of Step 1 is a sense current to the magnetic head 2, it sets to 9.0 mA. Prm.2 of Step 1 is a cut-off frequency, set to 100 MHz: Prm.3 of Step 1 is a threshold level, set to 50%. Thus, each of the parameter values are set in the IC 4 for read/write (R/W), and based on these parameters a read process is executed (ST3).

As in the first preferred embodiment, this read process inputs a sense current of 9.0 mA set in Prm.1 to the magnetic head 2, and judges whether or not the read data are normal (ST4). If the read data are abnormal, the process described above is repeated (No in ST4, ST5).

That is, in order to perform a retry it is judged if the number of retry steps reaches a maximum value (a predetermined MAX value) (ST5), and if it reaches the MAX value (Yes in ST5), the error process is performed and the process is terminated (ST6). However, if it does not reach the MAX value (No in ST5), Step n is incremented by one (ST7), and the step number of the retry table 14 is set to "2". Then, the parameters of Step 2 of the retry table 14 are read, and are set in the IC 4 for the read/write (R/W) (ST2).

For the parameters of Step 2, the sense current of Prm.1 is changed to 9.1 mA, and the other parameters, Prm.2, Prm.3, etc. are the same as those of the immediately preceding step (Step 1). Each of the parameter values is set in the IC 4 for read/write (R/W), and based on these parameters, a read process is executed again in the same way (ST3).

After that, the read process is repeated until normal data are obtained (No in ST4, ST5, ST7, ST2, ST3). If during this time, the frequency of retry steps reaches the MAX value (Yes in ST5), the error process is terminated (ST6).

On the other hand, when during the retry process the error is recovered from (Yes in ST4), the recovery frequency of the group containing Step n, is incremented by one (ST8). For example, if normal data can be obtained in the second retry process (n=2), "1" is added to the corresponding area G (2) of the error recovery frequency storage section 15. Then, the retrying frequency of the group (G (2)) is compared with a predetermined constant value (ST9). This constant value is the frequency of retries needed for an error to be recovered. For example, if the constant value is set to 10 as described in the first preferred embodiment, the judgement of error recovery (ST9) becomes Yes when in the retry process of the same group, an error is recovered at the tenth retry. In this preferred embodiment, error recovery is recognized in Step 2 (No in ST9), and "1" is added to the area G (2) in the error recovery frequency storage section 15.

After that, the same process is repeated, and when the error of the group containing a step is recovered, the recovery frequency of the group in the error recovery frequency storage section 15 is incremented by one (ST8). Then, when the recovery frequency of the same group becomes 10, the judgement (ST9) becomes Yes, and a group replacement is performed (ST11).

This process is different from the step replacement process described in the first preferred embodiment, and in this process, a replacement is performed between groups. For example, when group N−1 is replaced by group N, the data of Step (n−1) through Step (n+1) regarding the group N are written in a register "A", and the data of Step (n−4) through Step (n−2) regarding the group N−1 are overwritten in the empty area of the group N. Then, the data of the group N saved in the register "A" are written in the emptied registration area of the immediately preceding group N−1.

By the process described above, the data of the group N−1 is replaced by group N, and in the subsequent process (ST10), since the step of the immediately preceding group N is first read and retried, the frequency of retries can be reduced. That is, by a repetition of the process described above, as a result, a step with the parameter of data read conditions for obtaining normal data is positioned in an earlier read order, and thereby normal data can be rapidly read from the magnetic disk 1.

Although in this preferred embodiment, a threshold is assumed to be "10", it is not limited to "10", but an arbitrary numerical value can be used.

Although in the preferred embodiments, a sense current, a cut-off frequency and a threshold level are made variable, an adjustment level between the magnetic head 2 and tracks or another individual characteristic of the magnetic disk device can also be used for a parameter. For example, when the adjustment level between the magnetic head 2 and tracks is used for a parameter, the adjustment level against the center of tracks of the magnetic head 2 is changed such as from +0.00095 μm to +0.0019 μm, from +0.0019 μm to −0.00095 μm, from −0.00095 μm to −0.0019 μm, and a retry is performed.

Figure 9:
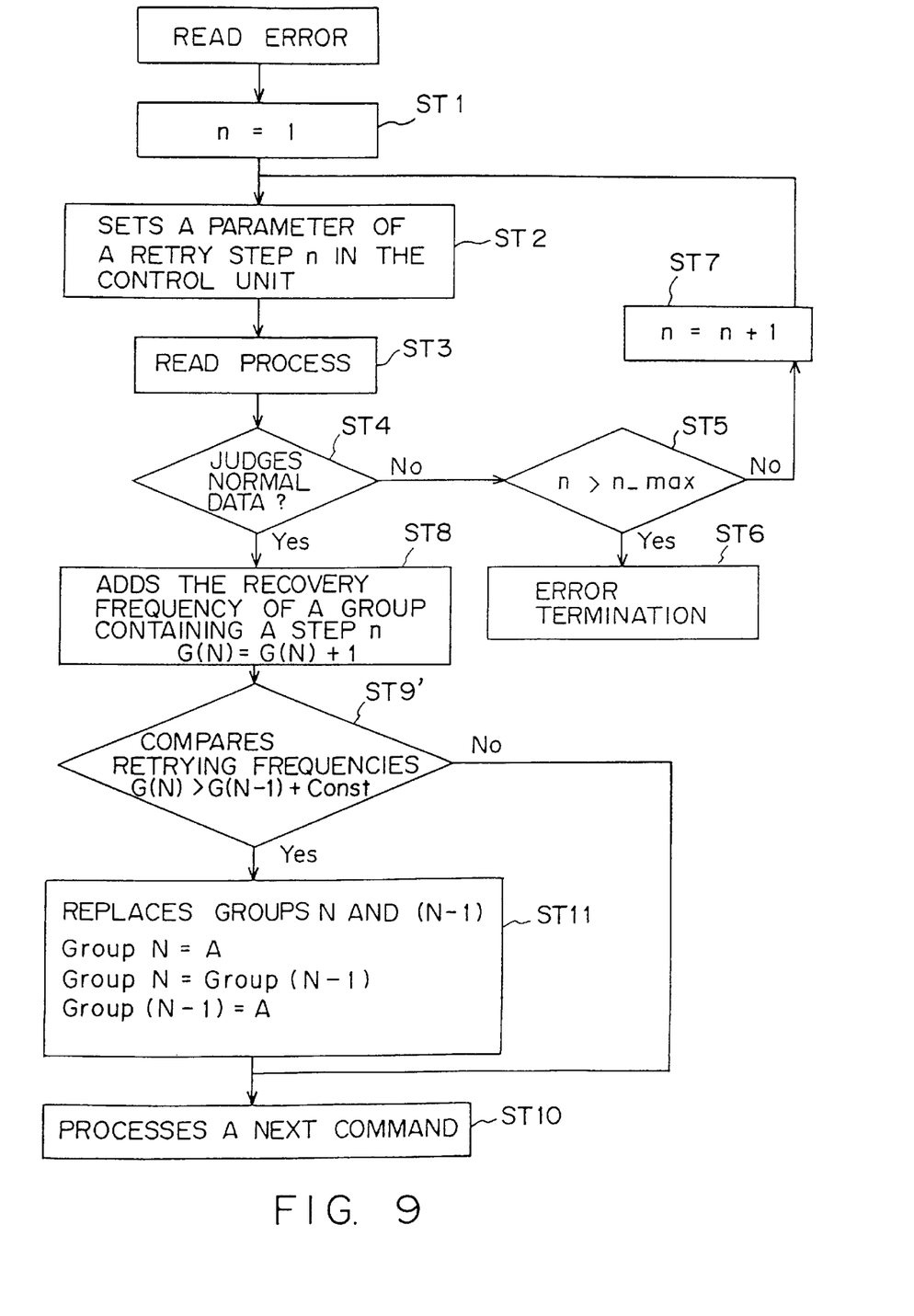
FIG. 9 is a flowchart showing another aspect of the second preferred embodiment.

Furthermore, in the preferred embodiment, when normal data can be obtained by a retry process, "1" is added to the corresponding area G (n) of the error recovery frequency storage section 15, and the value of the area G (n) is compared with a predetermined constant value (ST9). However, as shown in FIG. 9, the comparison of retry frequency can also be made using a formula G (n)>G (n−1)+Const (ST9').

That is, when the value of accumulated error recovery frequency of a certain group exceeds that of the immediately preceding group, and the difference between both the accumulated values exceeds a prescribed value, the group replacement described above is performed. For example, when it is a group N, a group replacement is performed between the group N and the immediately preceding group N−1.

By such a configuration, the frequency of retries performed until an error is recovered, can be reduced.

Although in the preferred embodiment, it is required that the value of accumulated error recovery frequency of a group exceeds that of the immediately preceding group, and there is a prescribed difference between both the accumulated values, a replacement between both the groups can be performed without the prescribed difference, only if the accumulated value exceeds that of an immediately preceding group.

Third Preferred Embodiment

Next, the third preferred embodiment of the present invention is described below.

In this preferred embodiment, the same system configuration shown in FIG. 1 as used in the description of the first and second preferred embodiments, is adopted. In this preferred embodiment, a parameter step for more further changing a parameter which is changed in the step, is added when the error recovery frequency of a certain retry step exceeds a regulated value.

Figure 10:
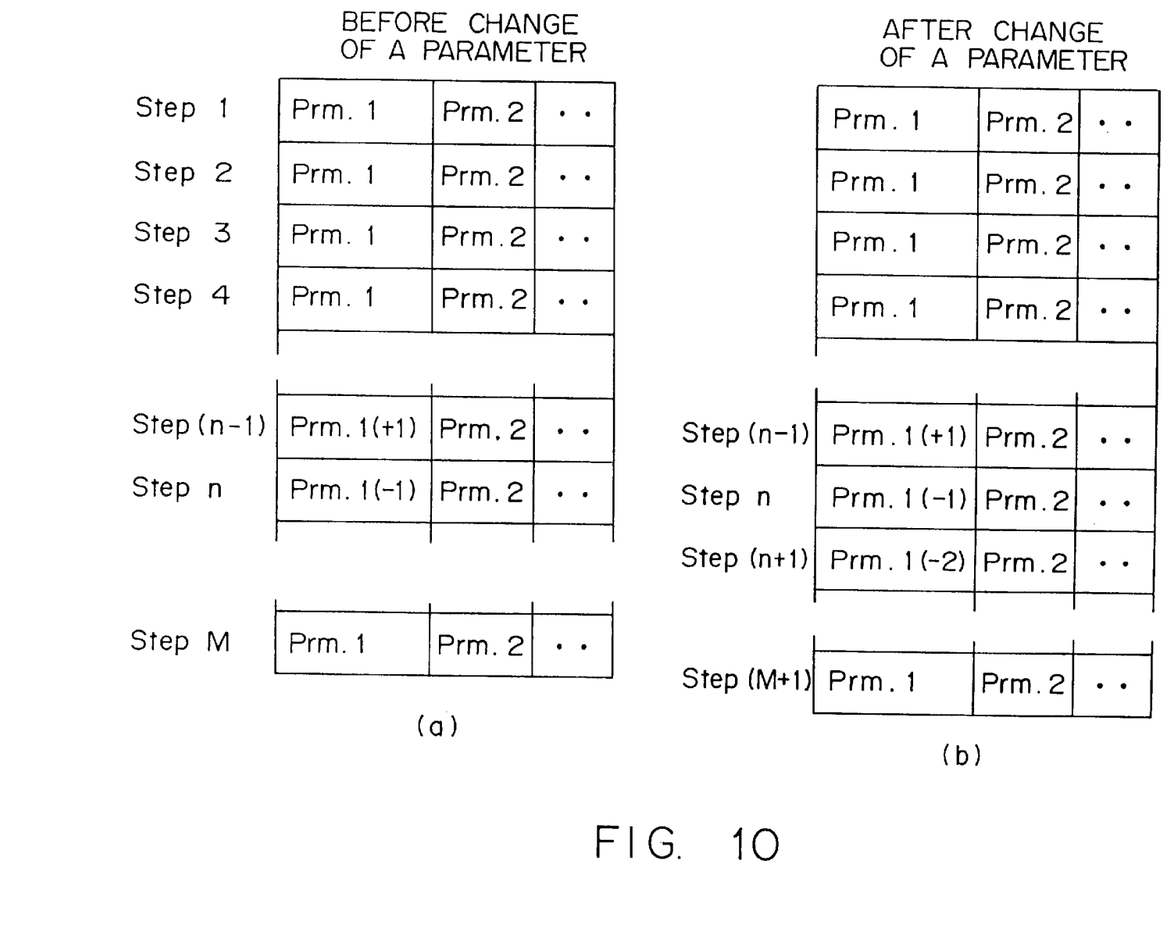
FIG. 10A shows the memory configuration before the change of a parameter.
FIG. 10B shows the memory configuration after the change of a parameter.

FIG. 10A shows a retry table before the change of a parameter, in which parameters are set in steps, Step 1 through Step M.

Next, the process of this preferred embodiment is described below.

Figure 11:
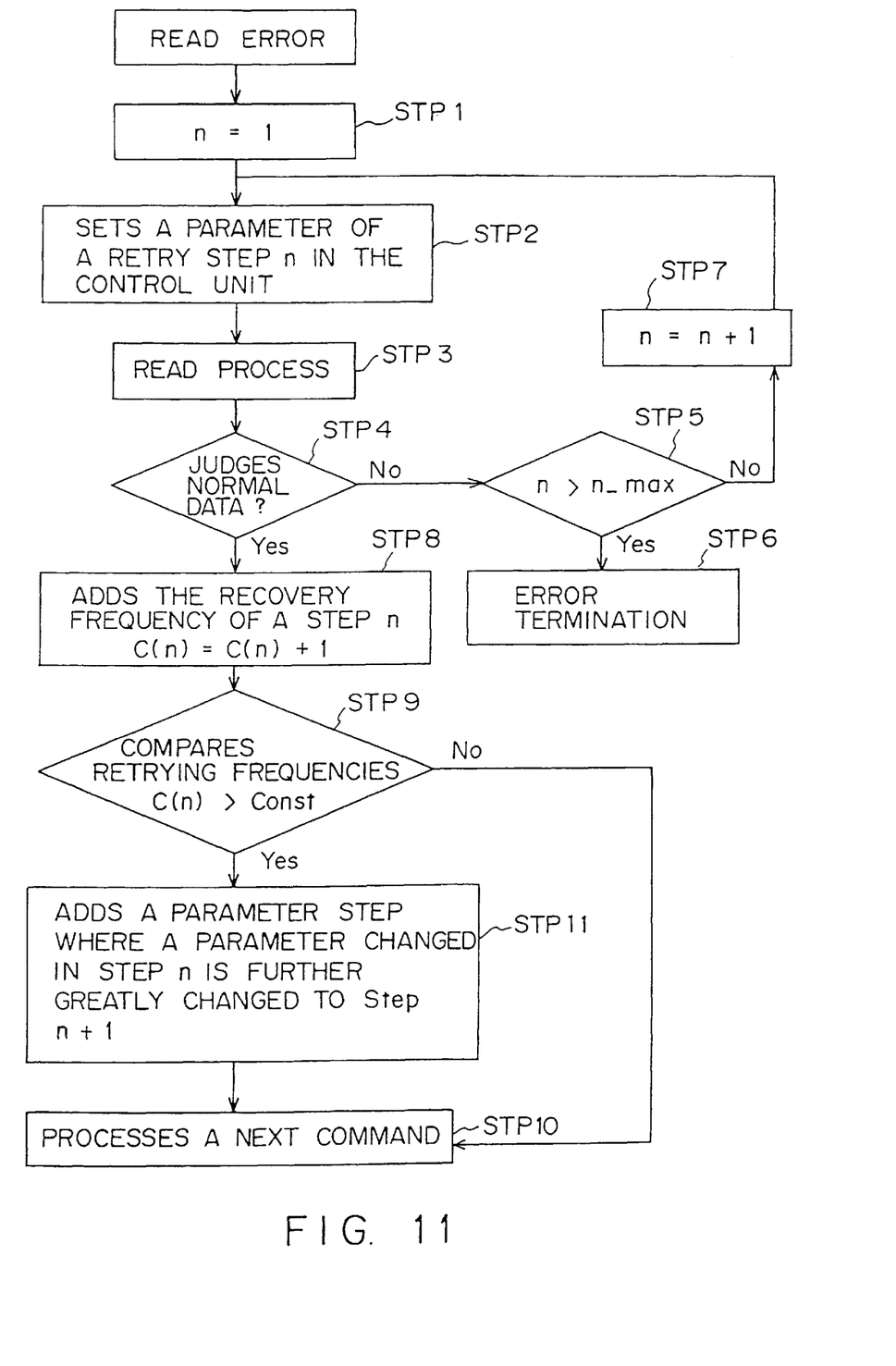
FIG. 11 is a flowchart showing the retry process of a third preferred embodiment.

FIG. 11 is a flowchart showing the process of this preferred embodiment. Also in this preferred embodiment, first, the step of the retry table of the storage unit 6 shown in FIG. 10A is set to "1" (step (hereinafter called STP) 1). That is, the number of the step of the retry table of the storage unit 6 shown in FIG. 10A is set to "1", the parameters stored in the step of the retry table are read, and the parameters are set in the IC 4 for read/write (R/W) (STP2).

For example, a sense current to a magnetic head 2 is set in Prm.1 of Step 1, a cut-off frequency in Prm.2 of Step 1, and a threshold level in Prm.3 of Step 1. Thus, the value of each of the parameters is read (STP3), and based on these parameters, a read process is executed.

In this read process, the same process as described earlier is performed, and if an error occurs, a retry step is repeated (No in STP4, STP5, STPs7, STP2, STP3).

During this period, as described earlier, only one parameter is changed, and a retry process is repeated. For example, for steps Step 1 through Step 4, only a sense current is changed, and for steps Step (n−2) through Step n, only a cut-off frequency is changed.

If the error is recovered during the process, that is, while only a specific parameter is changed, by further changing the changing direction of the parameter, the probability of recovery from an error is thought to be improved. For this reason, a data read condition whose value is further changed, is added in the changing direction of the parameter as a new step.

For example, in the example shown in FIG. 10B, a new step (Step (n+1)) is added after steps Step (n−1) and Step (n). As shown in FIG. 10B, the value of Prm.1 of Step n is larger than that of Step (n−1) (increases from +1 to +2), and if a data read condition for increasing the value of Prm. 1 up to +3 is added, the probability of recovery from an error is considered to be improved.

Under these circumstances, a new step, Step (n+1) for increasing the value of Prm.1 up to +3, is added (STP11). The addition process of this step is performed for the retry table 14 of the storage unit 6, and the step is used in retry processes after this.

With such a configuration, when a certain parameter is changed and an error recovery frequency exceeds the regulated frequency, the parameter value can be further changed in the same direction, and thereby a more rapid retry method of error recovery can be provided.

Although in the above description, the change of a parameter is expressed abstractly like +1, +2 and +3, for example, when the parameter is assumed to be sense current as described earlier, the change means the adding of a step (Step (n+1)) of changing only a sense current a further interval to 9.5 mA if the error recovery frequency exceeds the regulated value when Eve the sense current is changed from 9.3 mA to 9.4 mA.

The regulated value can also be "10", the same value as the threshold, or can be an arbitrary numerical value other than "10".

Although in the description of the preferred embodiments, a sense current, a cut-off frequency and a threshold level are made variable, an adjustment level between the magnetic head 2 and tracks or another individual characteristic of the magnetic disk device can also be used for a parameter.

Figure 12:
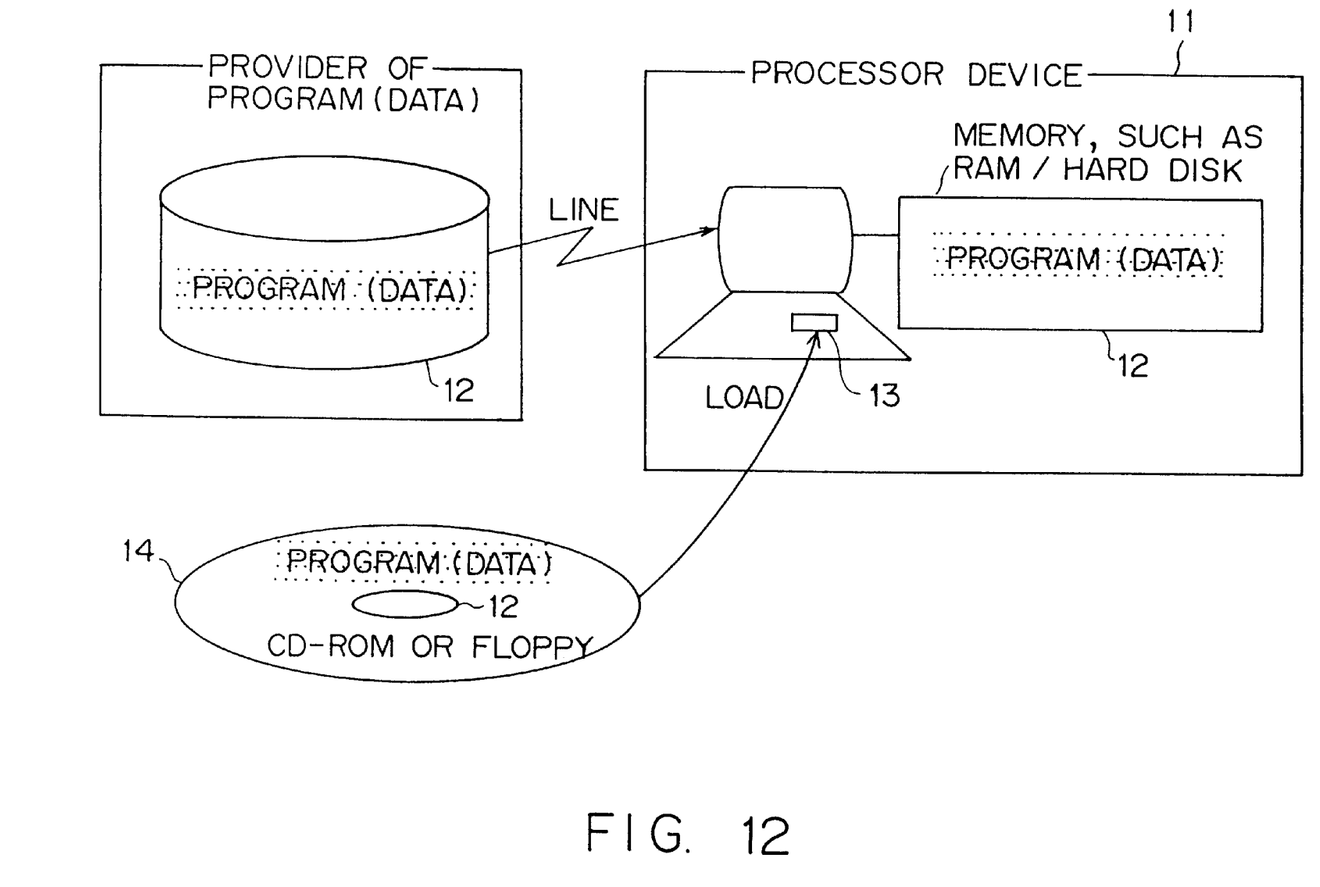
FIG. 12 shows the system configuration such that a storage medium is used.

FIG. 12 shows a system configuration using a storage medium. In FIG. 12, 11 is a processor device, and comprises a CPU, not shown in the drawing, and a memory device, such as a ROM, RAM, etc. The memory device stores a program (data) 12 to execute the processes of this preferred embodiment. Aa shown in FIG. 12, by inserting a storage medium 14, such as a floppy disk, CD-ROM, etc. in a driver 13, the program (data) 12 can also be provided by the storage medium 14. Alternatively, the program (data) 12 can be provided by, for example, a server through a network circuit.

As described in detail above, according to the present invention, when a individual characteristic of a magnetic disk device is made variable and data are read, by restoring the order of data read conditions under which the error is recovered from, a rapid retry becomes available.

When the value of accumulated error recovery frequency exceeds a prescribed threshold, by replacing the data read conditions, a more secure and rapid retry becomes available.

By making parameters variable in units of groups, the order of parameters where an error is easy to be recovered from can be advanced with priority, and thereby the retry can be performed in a shorter time.

Furthermore, by adding a new data read condition in the changing direction of a characteristic, to the changing direction of a parameter, a more rapid retry becomes available.

What is claimed is:

1. A disk device, comprising:
    storing means for storing a plurality of data read conditions with a predetermined order priority, each of said data read conditions being defined by a group of parameters for reading data from a disk;
    data reading means for reading data from said disk according to a first data read condition stored in said storing means;
    data re-reading means for, when an error occurs in data read by said data reading means, changing said first data read condition to a second data read condition and reading data from the disk again; and
    replacing means for, when the error is recovered from and normal data are obtained by said data re-reading means, replacing the orders of said first and second data read conditions.

2. The disk device according to claim 1, wherein a replacement of data read conditions by said replacing means is performed when an error recovery frequency of said second data read condition reaches a predetermined threshold.

3. The disk device according to claim 1, wherein a replacement of data read conditions by said replacing means is performed when a value of accumulated error recovery frequencies exceeds an accumulated value of error recovery frequencies of an immediately preceding data read condition.

4. The disk device according to claim 3, wherein a replacement of data read conditions by said replacing means is performed when a value of accumulated error recovery frequencies exceeds an accumulated value of error recovery frequencies of an immediately preceding data read condition and further there is a difference greater than a prescribed value between both the accumulated values.

5. The disk device according to claim 1, wherein when a value of accumulated error recovery frequency of said second data read condition exceeds a value of accumulated error recovery frequency of said first data read condition, a third data read condition whose parameter is made variable, is added.

6. The disk device according to claim 1, wherein the data read conditions are stored for each group where only the same parameter is changed, and said replacing means replaces the data read conditions in units of the groups.

7. The magnetic disk device according to claim 6, wherein the replacement in units of groups by said replacing means is performed when a value of accumulated error recovery frequency of a group exceeds a value of accumulated error recovery frequency.

8. The disk device according to claim 7, wherein the replacement in units of groups by said replacing means is performed when the value of accumulated error recovery frequency of a group exceeds the value of accumulated error recovery frequency and farther there is a difference greater than the prescribed value between both the accumulated values.

9. The disk device according to claim 1, wherein a replacement of data read conditions by said replacing means is performed to assign a higher priority to a most recent data read condition that accomplished a successful recovery from an error.

10. A data error correction method, comprising the steps of:
    storing a plurality of data read conditions with a predetermined order priority, each of said data read conditions being defined by a group of parameters for reading data from a disk;
    reading data from said disk according to a first data read condition;
    changing said first data read condition to a second data read condition and reading data from the disk again when an error occurs in the data read in said first data reading; and
    replacing orders of said first and second data read conditions.

11. The data error correction method according to claim 10, comprising the step of:
    storing the data read conditions in units of groups where only the same parameter is changed and replacing said data read conditions in units of the groups.

12. The data error correction method according to claim 10, wherein said replacing step is performed to assign a higher priority to a most recent data read condition that accomplished a successful recovery from an error.

* * * * *